United States Patent [19]
Boudreaux et al.

[11] Patent Number: 5,909,648
[45] Date of Patent: Jun. 1, 1999

[54] NETWORK INTERFACE AND METHOD FOR PROVIDING COMPLETE RECEPTION OF DATA

[75] Inventors: Paul Henry Boudreaux, Garland; Terry Wayne Bush, Plano; Justin Medlock, Richardson, all of Tex.

[73] Assignee: Northern Telecom Limited, Quebec, Canada

[21] Appl. No.: 08/611,459

[22] Filed: Apr. 11, 1996

[51] Int. Cl.$^6$ ....................................... H04A 7/38
[52] U.S. Cl. ........................ 455/422; 455/422; 455/466; 455/467
[58] Field of Search ..................... 455/422, 436, 455/466; 370/467, 259, 420, 522, 524; 375/358

[56] References Cited

U.S. PATENT DOCUMENTS

| | | |
|---|---|---|
| 4,654,867 | 3/1987 | Labedz et al. . |
| 4,912,756 | 3/1990 | Hop . |
| 5,375,161 | 12/1994 | Fuller et al. . |
| 5,463,628 | 10/1995 | Sorensen . |
| 5,579,372 | 11/1996 | Astrom . |
| 5,727,057 | 3/1998 | Emery et al. . |

OTHER PUBLICATIONS

Michel Mouly et al., "The GSM System for Mobile Communications," 1992, pp. 79–122, 132–148.

Mouly, The GSM System for Mobile Communications, pp. 651, 1982.

*Primary Examiner*—William Cumming
*Assistant Examiner*—Linwood C. Scott, Jr.
*Attorney, Agent, or Firm*—Finnegan, Henderson, Farabow, Garrett & Dunner, L.L.P.

[57] ABSTRACT

A network interface terminates communication between a disconnecting party (i.e., requesting a disconnect from the network interface) and a disconnected party in communication with the disconnecting party. The disconnecting and disconnected parties are connected to first and second networks, respectively. When receiving a disconnect request from the disconnecting party, the network interface initiates communication termination for the disconnecting party. If there is no buffered data to be transmitted to the disconnected party, the interface begins communication termination for the disconnected party. Otherwise, the interface transmits the buffered data to the disconnected party and then initiates communication termination for the disconnected party.

13 Claims, 4 Drawing Sheets

NETWORK INTERFACE AND METHOD FOR PROVIDING COMPLETE RECEPTION OF DATA

BACKGROUND OF THE INVENTION

The present invention is directed to a network interface for providing complete reception of data by a disconnected party when a disconnecting party requests termination of the communication.

A conventional Global System for Mobile Communication (GSM) network is described in "The GSM System for Mobile Communications," M. Mouly and M. Pautet, 1992, which is incorporated herein by reference. Briefly, the GSM network operates under GSM data services and supports the connection of GSM data services to data services of other networks, for example Public Switched Telephone Networks (PSTNs) and Integrated Services Digital Networks (ISDNs). The GSM standards call for an InterWorking Function (IWF). The IWF provides Mobile Switching Centers (MSCs) of the GSM network with protocol translation capabilities to interconnect GSM data services to data services of other networks. This protocol translation permits a data terminal connected to the GSM network to communicate with a data terminal connected to a PSTN or an ISDN, for example.

The data terminal, or terminal equipment, on the PSTN/ISDN side connects to the PSTN/ISDN via a modem or a terminal adaptor. The data terminal on the GSM network side, on the other hand, connects to the GSM network via a terminal adaptation function (TAF), a mobile station (MS), a radio channel between the MS and a base station system (BSS), and an "A-interface" between the BSS and an MSC. The MSC connects to the PSTN/ISDN, and has access to an internal or external IWF.

When establishing a data connection between the data terminals, data received from the PSTN/ISDN by the MSC goes to the IWF. The IWF converts data from the PSTN/ISDN to a form compatible with the A-interface, and sends the converted data back to the MSC for routing over the A-interface to the data terminal on the GSM side. The IWF also converts data received on the A-interface to a format compatible with the PSTN/ISDN data service for transmission to the PSTN/ISDN.

The IWF includes a memory for buffering the data arriving from the PSTN/ISDN to perform format conversion. This can lead to problems, however, when the PSTN/ISDN side initiates dropping the data connection (i.e., disconnection). The MSC normally responds to notification from the PSTN/ISDN that the connection has been dropped by immediately dropping the A-interface connection. This response, although appropriate for voice calls, can interrupt the A-interface while data destined for the data terminal on the GSM network side is still in the IWF memory. When this happens, some of the data destined for the data terminal on the GSM network side is lost.

A similar problem results when the data terminal on the GSM network side initiates dropping of the connection and there is data buffered in the IWF destined for the data terminal in the PSTN/ISDN network.

SUMMARY OF THE INVENTION

An object of the present invention is to assure complete reception of data destined for a disconnected party when a disconnecting party requests termination of the communication.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve these objects, and in accordance with the purpose of the invention as embodied and broadly described herein, the present invention includes a network interface for terminating communication between a disconnecting party requesting disconnection from the network interface and a disconnected party in communication with the disconnecting party. The disconnecting and disconnected parties are connected to first and second networks, respectively. The network interface temporarily buffers data during communication between the disconnecting party in the first network and the disconnected party in the second network.

When the disconnecting party requests a disconnection, the network interface initiates communication termination for the disconnecting party. The network interface determines whether there is any buffered data present that has not yet been transmitted to the disconnected party. If no buffered data is present, communication termination is initiated for the disconnected party. If buffered data is present, however, the buffered data is transmitted to the disconnected party and then communication termination is initiated for the disconnected party.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

DETAILED DESCRIPTION OF THE PREFERRED EMBODIMENTS

Figure 1:
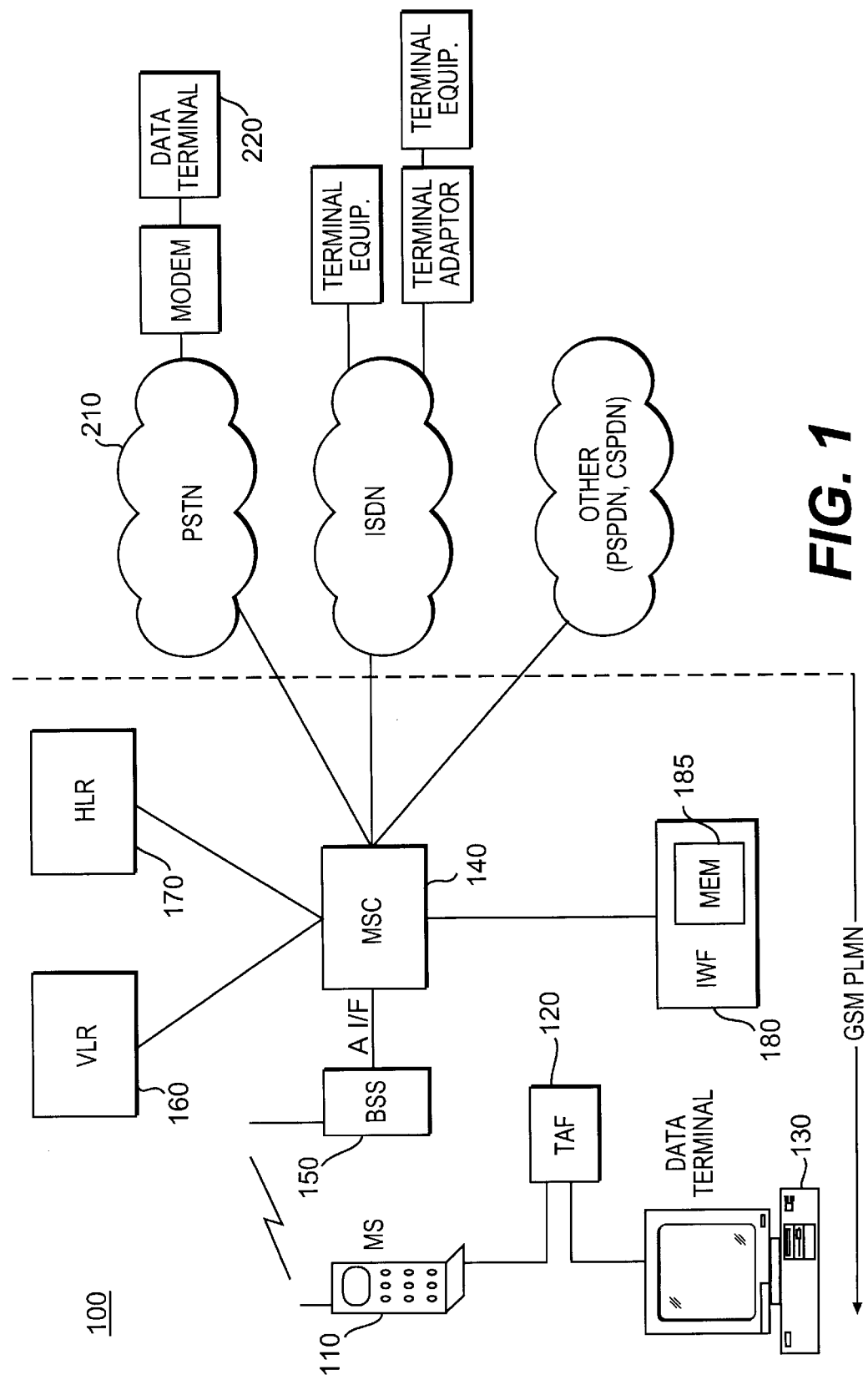
FIG. 1 shows a data terminal of a GSM network connected to a data terminal of a PSTN/ISDN.

FIG. 1 illustrates the user equipment, primary network nodes, and signalling interfaces that might be involved in a data call in a GSM network in accordance with this invention. The user equipment consists of MS 110, TAF 120, and data terminal 130. The network nodes include MSC 140, BSS 150, a visitor location register (VLR) 160, a home location register (HLR) 170, and IWF 180. IWF 180 includes buffer memory 185. Together these components form a GSM Public Land Mobile Network (PLMN) 100.

A party from the GSM network, such as data terminal 130, communicates via MSC 140 with a party from PSTN 210, such as data terminal 220. A discussion regarding how the communication was set up and maintained is not important in realizing the present invention, and will, therefore, not be discussed.

Once communication has been established between the two parties, one party will eventually request "call clearing" or termination of the communication. The party requesting call clearing is the "disconnecting" party, and the other party is the "disconnected" party.

During call clearing, MSC 140 is responsible for "holding" the connection towards the disconnected party while IWF 180 completes the data transmission by flushing any buffered data towards the disconnected party. IWF 180 discards any buffered data towards the disconnecting party. This is known as "Hold Disconnect."

To accomplish such holding, MSC 140 sends an IWF-Release-Request message to IWF 180. The message indicates that either (1) the disconnecting party has cleared and that IWF 180 is to flush any buffered data stored in its memory 185 (flush-towards-mobile-side or flush-towards-network-side), or, (2) an error condition has arisen and MSC 140 is clearing the data call (immediate-release).

Figure 2A:
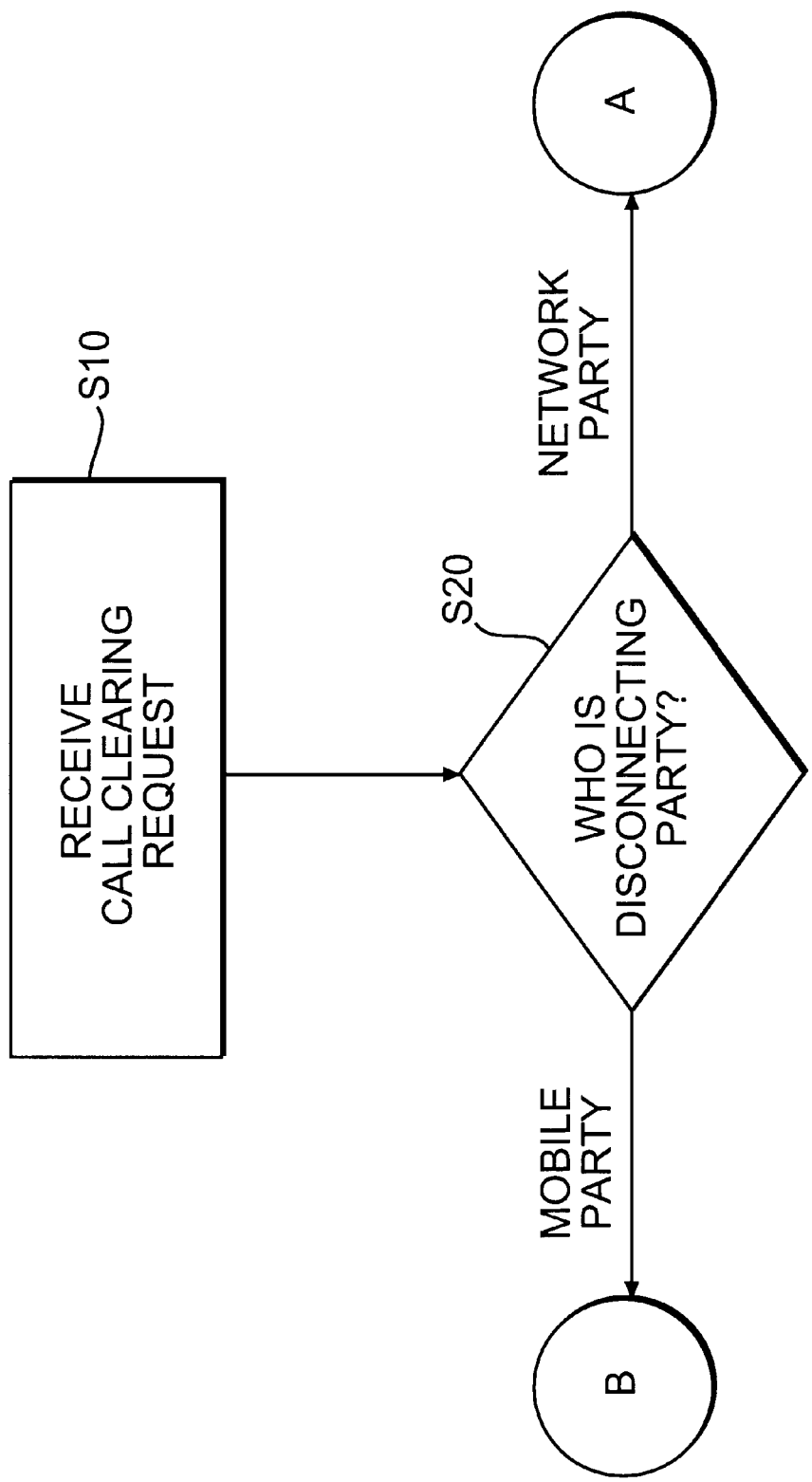
FIGS. 2A, 2B, and 2C show a flow chart depicting the call clearing process of the present invention.
Figure 2B:
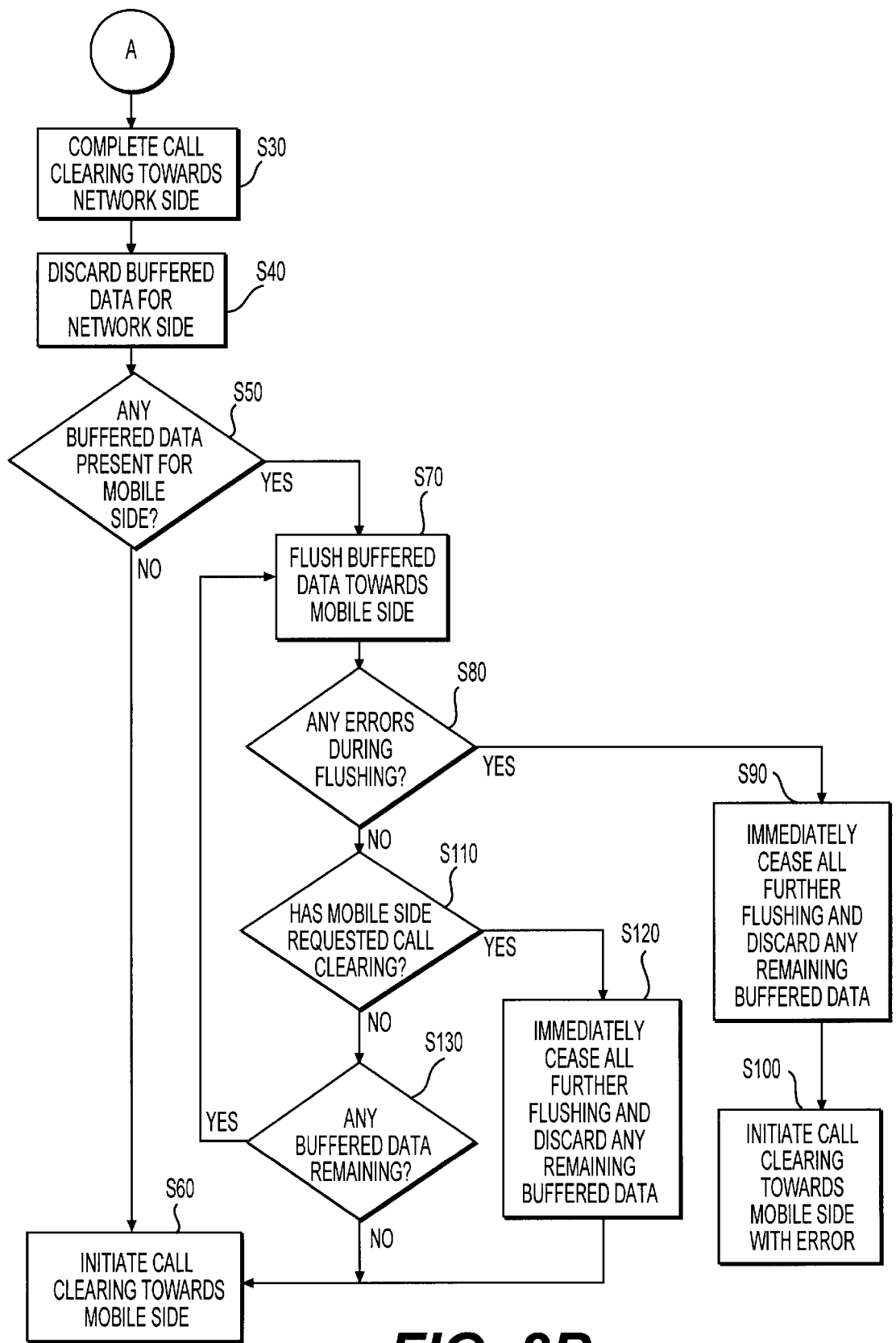
Figure 2C:
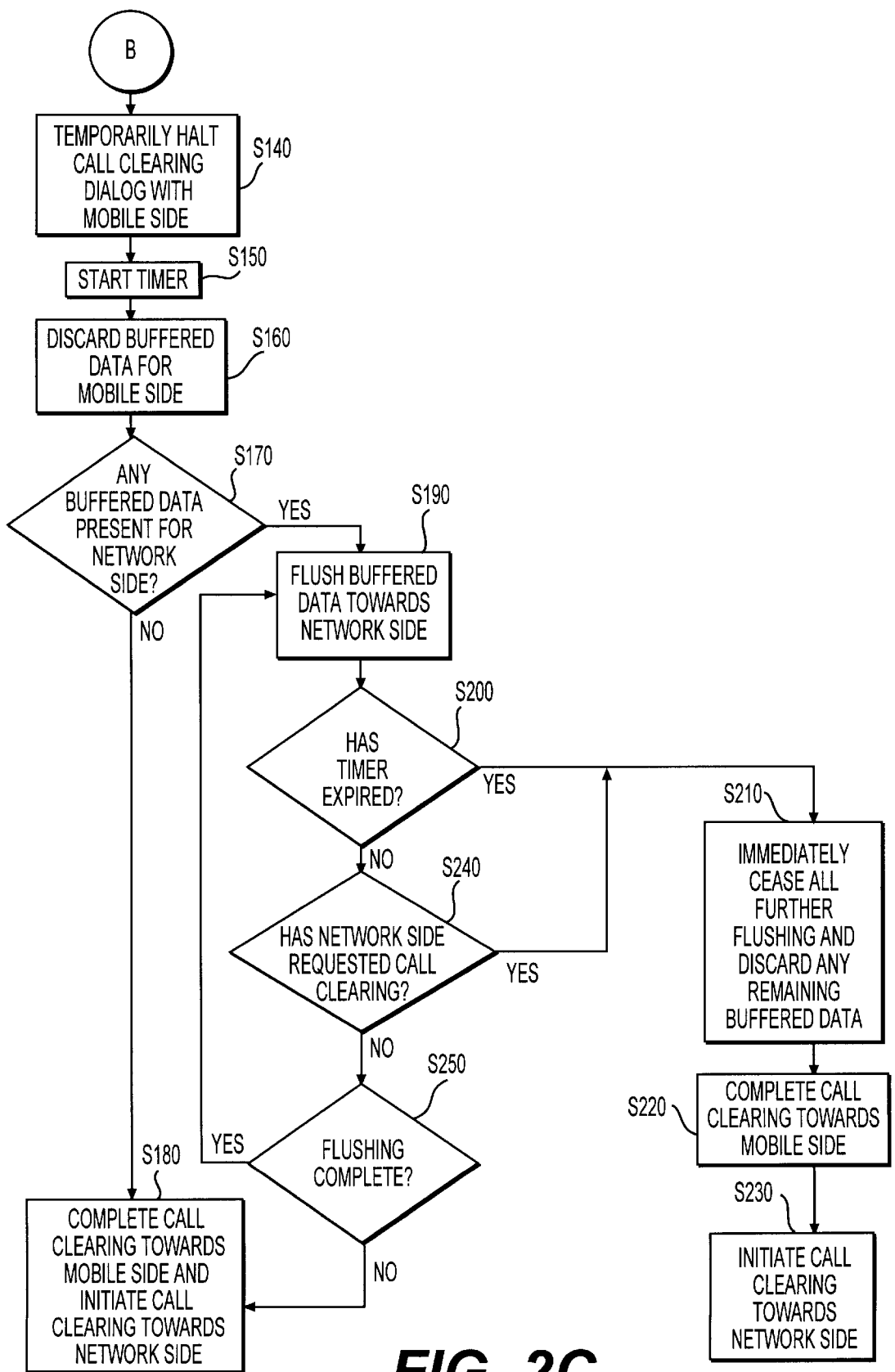

FIGS. 2A–2C show a flow chart depicting the call clearing process. The process begins as shown in FIG. 2A when MSC 140 receives a call clearing request from one of the communicating parties (step S10). MSC 140 then determines whether the network, side party (NSP) or the mobile side party (MSP) initiated the call clearing request (step S20).

When the network party initiates the call clearing, the process in FIG. 2B occurs. When the mobile party initiates call, clearing, the process in FIG. 2C occurs.

According to the process in FIG. 2B, MSC 140 completes call clearing towards the NSP (step S30), and (sends an IWF-Release-Request(flush-towards-mobile-side) message to IWF 180). This message notifies IWF 180 that the NSP has cleared and that any buffered data destined for MS 110 must be flushed towards the MSP. Before sending the IWF-Release-Request message, however, MSC 140 starts a timer $T_{iwf\text{-}rel}$. The timer counts down the maximum amount of allowable time between when MSC 140 sends the IWF-Release-Request message to IWF 180 and when IWF 180 must respond with an IWF-Release-Response message.

Upon receiving the IWF-Release-Request(flush-towards-mobile-side) message, IWF 180 discards any buffered data remaining for the NSP (step S40). IWF 180 then determines whether there is any data to flush towards the MSP (step S50), and sends an IWF-Release-Response message to MSC 140, denoting, via a response code, the result of this determination. The IWF-Release-Response message can take three forms: an IWF-Release-Response(request-done) message sent when no buffered data to flush towards the MSP remains; an IWF-Release-Response(buffer-not-flushed) message sent when buffered data remains to be flushed towards the MSP; and an IWF-Release-Response(some other response code) message sent to indicate some other condition, such as an error condition.

If MSC 140 receives no response message from IWF 180 before timer $T_{iwf\text{-}rel}$ expires, MSC 140 resets timer $T_{iwf\text{-}rel}$ and repeats the release dialog with IWF 180. If timer $T_{iwf\text{-}rel}$ expires a second time, MSC 140 sends an IWF-Release-Request(immediate-release) message to IWF 180, removes it from service, and clears the call with error.

When no buffered data is present, IWF 180 sends the IWF-Release-Response (request-done) message to MSC 140. In response, MSC 140 initiates normal call clearing towards the MSP (step S60).

When buffered data is present, however, IWF 180 sends the IWF-Release-Response(buffer-not-flushed) message, and begins flushing the buffered data towards the MSP (step S70). Upon receipt of the IWF-Release-Response message, MSC 140 stops timer $T_{iwf\text{-}rel}$ and starts timer $T_{iwf\text{-}san}$.

Timer $T_{iwf\text{-}san}$ is a "sanity" timer that MSC 140 uses when the network has initiated call clearing and IWF 180 is flushing its buffer towards the MSP. This timer determines the frequency that MSC 140 queries IWF 180 via the IWF-Release-Request/IWF-Release Response message dialog to determine the status of flushing its buffer.

There is no restriction on the amount of time required to flush when flushing towards the MSP. For example, a 1M byte buffer at 300 bps will take approximately 8 hours to flush given a nominal error rate over the air interface. Because there is no way to predict how long it will take for IWF 180 to flush its buffers towards the MSP, IWF 180 is queried every $T_{iwf\text{-}san}$ seconds as a "sanity" check to ensure that it is still functioning properly (step S80).

MSC 140 initiates the release dialog every $T_{iwf\text{-}san}$ seconds to ensure that IWF 180 is functioning properly and is still flushing its buffer towards the MSP (step S80). IWF 180 indicates by a response-code in the IWF-Release-Response message if it has encountered a problem and is unable to flush the remaining data in its buffer. If this occurs, MSC 140 sends an IWF-Release-Request(immediate-release) message to IWF 180 causing IWF 180 to cease all further flushing immediately and discard any remaining buffered data (step S90). MSC 140 then removes IWF 180 from service and clears the call with error (step S100).

There may be instances when MS 110 initiates call clearing before IWF 180 can flush all of its data (step S110), or MSC 140 encounters some unrecoverable error condition causing the call to be terminated. In such cases, and where possible depending on the severity of the problem, MSC 140 sends an IWF-Release-Request(immediate-release) message to IWF 180. In response, IWF 180 aborts all data communications (step S120) and initiates call clearing towards the MSP (step S60).

If MSC 140 receives no IWF-Release-Response(request-done) message before timer $T_{iwf\text{-}san}$ expires, MSC 140 starts timer $T_{iwf\text{-}rel}$ and initiates the release dialog again with IWF 180 (step S130).

While flushing the buffered data, IWF 180 immediately notifies MSC 140 by an IWF-Release-Response(request-done) message as soon as all data has been flushed towards the MSP. IWF 180 does not wait for a release dialog from a $T_{iwf\text{-}san}$ to expire. In response to this IWF-Release-Response message, MSC 140 initiates normal call clearing towards the MSP (step S60).

In FIG. 2C, MSC 140 temporarily halts the call clearing dialog with the MSP (step S140), and sends an IWF-Release-Request(flush-towards-network-side) message to IWF 180. This message notifies IWF 180 that MS 110 (MSP side) has cleared, and that any buffered data destined for the network side must be flushed towards the NSP.

Before sending the IWF-Release-Request(flush-towards-network-side) message, MSC 140 starts timers $T_{iwf\text{-}rel}$ and $T_{iwf\text{-}305}$ (step S150). Timer $T_{iwf\text{-}rel}$ is the same as previously described. Timer $T_{iwf\text{-}305}$ is a sanity timer MSC 140 uses when MS 110 has initiated call clearing and IWF 180 is flushing its buffer towards the NSP. This timer is based on a DTAP timer $T_{305}$ that governs the maximum amount of time for MSC 140 to respond to MS's 110 call clearing request. Therefore, IWF 180 must flush its buffers and notify MSC 140 of this fact before timer $T_{iwf\text{-}305}$ expires. If timer $T_{iwf\text{-}305}$ expires, MSC 140 aborts the buffer flushing and continues call clearing to avoid a protocol violation with MS 110.

When the data call is a Non-Transparent data call, IWF 180 must negotiate with MS 110 for a Radio Link Protocol (RLP) window of sufficient size to allow the IWF memory 185 to flush within $T_{iwf\text{-}305}$ seconds. A Non-Transparent data call uses RLP. RLP is a layer 2 error-correcting data communications protocol that provides an error-free communications link between MS 110 and IWF 180. RLP introduces variable transit delay and throughput.

Upon receiving the IWF-Release-Request(flush-towards-network-side) message, IWF 180 discards any buffered data remaining for the MSP (step S160). IWF 180 then determines whether there is any data to flush towards the NSP (step S170), and sends MSC 140 an IWF-Release-Response message denoting via a response code the result of this determination. The IWF-Release-Response message can take three forms: an IWF-Release-Response(request-done) message sent when no buffered data to flush towards the NSP remains; an IWF-Release-Response(buffer-not-flushed) message sent when buffered data remains to be flushed towards the NSP; and an IWF-Release-Response (some other response code) message sent to indicate some other condition, such as an error condition.

If MSC 140 receives no response message from IWF 180 before timer $T_{iwf-rel}$ expires, MSC 140 resets timer $T_{iwf-rel}$ and repeats the release dialog with IWF 180. If timer $T_{iwf-rel}$ expires for a second time, MSC 140 sends an IWF-Release-Request(immediate-release) message to IWF 180, removes it from service, and clears the call with error.

When no buffered data is present, IWF 180 sends the IWF-Release-Response(request-done) message to MSC 140. In response, MSC 140 completes call clearing towards the MSP and initiates call clearing towards the NSP (step S180).

When buffered data is present, however, IWF 180 sends MSC 140 the IWF-Release-Request(buffer-not-flushed) message, and begins flushing the buffered data towards the NSP (step S190). Upon receipt of the IWF-Release-Response message, MSC 140 stops timer $T_{iwf-rel}$, although timer $T_{iwf-305}$ continues to run. Timer $T_{iwf-san}$ is not started because it does not apply when flushing towards the NSP because IWF 180 must complete flushing within the minimum time-out value specified for timer $T_{iwf-305}$ which, in a preferred embodiment, is 21 seconds. Thus, unlike flushing towards the MSP, MSC 140 does not query IWF 180 again.

If timer $T_{iwf-305}$ expires (step S200), then MSC 140 sends an IWF-Release-Response(immediate-release) message to IWF 180 causing IWF 180 to cease all further flushing immediately and discard any remaining buffered data (step S210). MSC 140 then completes call clearing towards the MSP (step S220), and initiates normal call clearing towards the NSP (step S230).

There may be instances when the network initiates call clearing before timer $T_{iwf-305}$ expires and before IWF 180 can flush all of its data (step S240), or MSC 140 encounters some unrecoverable error condition that causes the call to be terminated. In such cases, and where possible depending on the severity of the problem, MSC 140 sends an IWF-Release-Request(immediate-release) message to IWF 180. In response, IWF 180 aborts all data communications (step S210) and MSC 140 clears the call (steps S220–S230).

If timer $T_{iwf-305}$ has not yet expired and all data has been flushed towards the NSP, IWF 180 immediately notifies MSC 140 by an IWF-Release-Response(request-done) message (step S250). In response to this message, MSC 140 completes call clearing towards the MSP and simultaneously initiates normal call clearing towards the NSP (step S180).

As can be seen from the flow chart depicted in FIGS. 2A–2C, the present invention assures complete reception of data destined for a disconnected party when a disconnecting party requests termination of the communication.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. For example, the present invention is not limited to connection to just PSTN/ISDN data services, but is generic to the connection of GSM data services to a variety of other data services. Moreover, the present invention applies to any connection of data services in which data transmitted across the interface is temporarily buffered. The scope of the invention is defined by the claims and their equivalents.

What is claimed is:

1. A method for terminating communication between a disconnecting party requesting disconnection from a network interface and a disconnected party in communication with the disconnecting party, the disconnecting and disconnected parties communicating via the network interface over at least one network, the method comprising the steps, implemented by the network interface, of:

receiving a disconnect request from the disconnecting party;

initiating communication termination for the disconnecting party;

determining the presence of any buffered data in the network interface that has not yet been transmitted to the disconnected party in response to the initiation of communication termination;

initiating communication termination for the disconnected party when buffered data for the disconnected party is not present; and transmitting the buffered data to the disconnected party and then initiating communication termination for the disconnected party when buffered data for the disconnected party is present.

2. The method of claim 1, further comprising the step of periodically checking the transmission of the buffered data for errors.

3. A network interface for terminating communication between a disconnecting party requesting disconnection from the network interface and a disconnected party in communication with the disconnecting party, the disconnecting party being connected to a first network and the disconnected party being connected to a second network, the network interface comprising:

means for temporarily buffering data during communication between the disconnecting party in the first network and the disconnected party in the second network;

means for receiving a disconnect request from the disconnecting party;

means for initiating communication termination for the disconnecting party;

means for determining the presence of any buffered data in the buffering means that has not yet been transmitted to the disconnected party in response to the means for initiating communication termination;

means for transmitting the buffered data to the disconnected party when the determining means determines that buffered data for the disconnected party is present; and means for initiating communication termination for the disconnected party.

4. The network interface of claim 3, wherein the first network is a GSM network and the second network is one of an ISDN and PSTN.

5. The network interface of claim 4, wherein the disconnecting party is a mobile user and the disconnected party is a data terminal user.

6. The network interface of claim 5, further comprising means for setting a timer to a predetermined value after the receiving means receives the disconnect request, and means for determining whether the timer expires before the transmitting means has transmitted all of the buffered data to the disconnected party.

7. The network interface of claim 3, wherein the first network is one of an ISDN and PSTN and the second network is a GSM network.

8. The network interface of claim 7, wherein the disconnecting party is a data terminal user and the disconnected party is a mobile user.

9. The network interface of claim 8, further comprising means for periodically checking said transmitting means for errors.

10. A method for terminating communication between a first party and a second party, the first and second parties being connected to first and second networks, respectively, and communicating via a network interface, the method comprising the steps, implemented by the network interface, of:

buffering data during communication between the first and second parties in the first and second networks;

receiving a disconnect request;

determining which of the first and second parties initiated the disconnect request;

executing a first call termination procedure when the disconnect request was initiated by the first party, the first call termination procedure including the steps of terminating communication with the first party, determining the presence of any buffered data in the network interface that has not yet been transmitted to the second party in response to the termination of communication, initiating communication termination for the second party when no buffered data for the second party is present, and transmitting the buffered data to the second party and then initiating communication termination for the second party when buffered data for the second party is present; and executing a second call termination procedure when the disconnect request was initiated by the second party, the second call termination procedure including the steps of temporarily halting communication termination dialog with the second party, setting a timer to a predetermined number, determining the presence of any buffered data in the network interface that has not yet been transmitted to the first party, completing communication termination for the second party and initiating communication termination for the first party when no buffered data for the first party is present, transmitting the buffered data to the first party when buffered data for the first party is present, determining if the timer expires before all the buffered data is transmitted to the first party, stopping further transmissions of the buffered data and discarding remaining buffered data when the timer expires, completing communication termination for the second party, and initiating communication termination for the first party.

11. An interface for a GSM network connecting a first mobile user in the GSM network to a second terminal device user in one of an ISDN and PSTN for communication therebetween, the interface comprising:

an interworking function for translating communications between the first and second users, the interworking function including a buffer for temporarily storing the communications between the first and second users; and a mobile switching center including means for receiving a disconnect request from one of the first and second users, means for determining which one of the first and second users is a disconnecting user and which one is a disconnected user, the disconnecting user being the one of the first and second users that initiated the disconnect request and the disconnected user being the other one of the first and second users, means for initiating communication termination for the disconnecting user, means for determining the presence of data for the disconnected user in the buffer of the interworking function in response to the initiation of communication termination, means for transmitting the data stored in the buffer to the disconnected user when the determining means determines that data for the disconnected user is present, and means for initiating communication termination for the disconnected user.

12. A network interface for terminating communication between a disconnecting party, which is a mobile user, requesting disconnection from the network interface and a disconnected party, which is a data terminal user, in communication with the disconnecting party, the disconnecting party being connected to a first network, which is a GSM network, and the disconnected party being connected to a second network, which is one of an ISDN and PSTN, the network interface comprising:

means for temporarily buffering data during communication between the disconnecting party in the first network and the disconnected party in the second network;

means for receiving a disconnect request from the disconnecting party;

means for setting a timer to a predetermined value after the receiving means receives the disconnect request;

means for determining whether the timer expires before the transmitting means has transmitted all of the buffered data to the disconnected party;

means for initiating communication termination for the disconnecting party;

means for determining the presence of any buffered data in the buffering means that has not yet been transmitted to the disconnected party;

means for transmitting the buffered data to the disconnected party when the determining means determines that buffered data for the disconnected party is present;

means for initiating communication termination for the disconnected party; and means for stopping further transmission of the buffered data by the transmitting means and for discarding any remaining buffered data when the determining means determines that the timer has expired.

13. A network interface for terminating communication between a disconnecting party requesting disconnection from the network interface and a disconnected party in communication with the disconnecting party, the disconnecting party being connected to a first network and the disconnected party being connected to a second network, the network interface comprising:

means for temporarily buffering data during communication between the disconnecting party in the first network and the disconnected party in the second network;

means for receiving a disconnect request from the disconnecting party;

means for initiating communication termination for the disconnecting party;

means for determining the presence of any buffered data in the buffering means that has not yet been transmitted to the disconnected party;

means for transmitting the buffered data to the disconnected party when the determining means determines that buffered data for the disconnected party is present;

means for initiating communication termination for the disconnected party; and means for discarding any buffered data in the buffering means that has not yet been transmitted to the disconnecting party.

\* \* \* \* \*